United States Patent [19]

Suzuki et al.

[11] Patent Number: 5,561,447

[45] Date of Patent: Oct. 1, 1996

[54] COORDINATE INPUT APPARATUS

[75] Inventors: Noriyuki Suzuki; Shigeki Mori, both of Tokyo; Atsushi Tanaka, Kawasaki, all of Japan

[73] Assignee: Canon Kabushiki Kaisha, Tokyo, Japan

[21] Appl. No.: 396,073

[22] Filed: Feb. 28, 1995

Related U.S. Application Data

[63] Continuation of Ser. No. 930,468, Aug. 20, 1992, abandoned, which is a continuation of Ser. No. 475,864, Feb. 6, 1990, abandoned.

[30] Foreign Application Priority Data

Feb. 15, 1989  [JP]  Japan ..................... 1-33798
Mar. 29, 1989  [JP]  Japan ..................... 1-74894

[51] Int. Cl.⁶ ..................................... G09G 5/00
[52] U.S. Cl. ................................ 345/179; 178/18
[58] Field of Search ........................ 345/173, 174, 345/178; 178/18, 19; 318/687; 364/709.11

[56] References Cited

U.S. PATENT DOCUMENTS

| | | | |
|---|---|---|---|
| 4,477,877 | 10/1984 | Nakamura et al. | 178/18 |
| 4,564,928 | 1/1986 | Glenn et al. | 178/18 |
| 4,575,580 | 3/1986 | Jandrell | 178/18 |
| 4,660,055 | 4/1987 | Enda | 318/687 |
| 4,775,765 | 10/1988 | Kimura et al. | |
| 4,789,836 | 12/1988 | May | 340/707 |
| 4,866,646 | 9/1989 | Nakamura et al. | 364/709.11 |
| 4,886,943 | 12/1989 | Suzuki et al. | 178/18 |
| 4,931,965 | 6/1990 | Kaneko et al. | 178/18 |
| 4,947,156 | 8/1990 | Sato et al. | 340/706 |

FOREIGN PATENT DOCUMENTS 0184535   6/1986   European Pat. Off. .

Primary Examiner—Ulysses Weldon
Assistant Examiner—Amare Mengistu
Attorney, Agent, or Firm—Fitzpatrick, Cella, Harper & Scinto

[57] ABSTRACT

A coordinate input apparatus in which by indicating a desired position on a coordinate input surface by an input pen, coordinate value data of the indicated position is detected and output, includes: an output device to output the coordinate value data; a detector for detecting the down state of the input pen; a memory for storing the coordinate value data detected after the elapse of a predetermined time from the detection of the pen-down state by detector; and a controller for allowing the coordinate value data stored in the memory to be output by the output device such as a liquid crystal display. With the apparatus, the fluctuations of the coordinate value data just after the pen-down operation and just before the pen-up operation can be eliminated and the stable coordinate value data can be always output. An erroneous detection due to the fluctuation of the coordinate value data upon coordinate input can be prevented.

7 Claims, 9 Drawing Sheets

FIG. 3(a)

ADDRESS

| | |
|---|---|
| $\ell$ | COUNTER |
| $\ell+1$ | #1 COORDINATE VALUE |
| $\ell+5$ | #2 COORDINATE VALUE |
| ⋮ | ⋮ |
| $\ell+4n-3$ | #n COORDINATE VALUE |

FIG. 3(b)

ADDRESS

| | |
|---|---|
| $\ell$ | COUNTER |
| $\ell+1$ | #1 COORDINATE VALUE |
| $\ell+5$ | #2 COORDINATE VALUE |
| ⋮ | ⋮ |
| $\ell+4n-3$ | #n COORDINATE VALUE |

← CURRENT SAMPLING DATA

→ OUTPUT

ACTUAL TRACE

COORDINATE INPUT APPARATUS

This application is a continuation of application Ser. No. 07/930,468 filed Aug. 20, 1992, now abandoned; which is a continuation of application Ser. No. 07/475,864, filed Feb. 6, 1990, now abandoned.

BACKGROUND OF THE INVENTION

1. Field of the Invention

The present invention relates to a coordinate input apparatus and, more particularly, to a coordinate input apparatus for detecting the position of a coordinate input pen which was pressed at a desired position on a coordinate input plate and for-outputting to a target apparatus.

2. Related Background Art

In recent years, a system for recognizing hand writing characters and figures in an on-line manner attracts attention as a system which can realize a man-machine interface of the next generation. In a hand writing recognition system, a coordinate input apparatus and a display are arranged so as to overlap and the trace of the characters or figures which are hand written by a pen-shaped indicator is displayed as it is by the display. That is, characters, figures, etc. can be input as if they are hand written onto a paper.

In such a system, the coordinate input apparatus is controlled in a manner such that the coordinate value data which was digitized at a necessary resolution is sampled every predetermined period of time and the coordinate value data is stored in a predetermined area in a memory device or transmitted to a main information processing apparatus through communicating means for every sampling operation. A group of coordinate value data is hereinafter referred to as dot train data.

It is improper that the main information processing apparatus for recognizing characters or the like directly uses the stored or transmitted dot train data in the original form.

In other words, it takes a certain amount of time to calculate the coordinate value data. Therefore, during the calculation of the coordinate value data, the coordinate position which is indicated by an input pen fluctuates and an oscillation occurs because, for instance, the input pen is slightly lifted up or the input pen slightly slides or the like. Even in such a case, there is a problem such that when the coordinate value is calculated on the basis of a voltage value or the like and is used as an input coordinate position in a manner similar to an ordinary case, a coordinate value data which is not desired by the operator is input.

In the coordinate input apparatus of the resistive sheet type, the ultrasonic vibration type, or the like which can easily construct a tablet surface from a transparent member, the fluctuation of the detection coordinates is large in a transient state of a writing pressure just after the pen-up operation, just before the pen-down operation, and the like. The above dot train data also includes the data in the transient period of time of the writing pressure.

Since such a fluctuation of the coordinate value data is fairly, inconvenient in the recognition of characters or figures, after one character or one figure was completely input, dot train data in which factors of such a fluctuation were eliminated from the dot train data obtained by the input of the character or figure must be newly reconstructed and the process to recognize the character, figure, or the like must be executed on the basis of the reconstructed dot train data.

However, such a method has the following drawbacks.

1) In addition to an area to store the dot train data, another area to store the dot train data which was reconstructed by eliminating the fluctuation factors is needed.

2) In the case of a character or a figure such as a Chinese character or the like in which the number of strokes is large and a number of complicated component elements exist, it takes a fairly long time to execute the process to eliminate the fluctuation factors.

The above drawbacks also cause, for instance, deterioration of a recognition ratio and a recognition speed of characters, figures, or the like.

SUMMARY OF THE INVENTION

It is an object of the present invention to provide a coordinate input apparatus which can eliminate the fluctuation of coordinate value data just after a pen-down operation or just before a pen-up operation of an input pen to input coordinates.

Another object of-the invention is to provide a coordinate input apparatus which can always output stable coordinate value data.

Still another object of the invention is to provide a coordinate input apparatus in which when it is determined that an input pen to input coordinates has been set into a pen-down state, the coordinate data which was detected after the elapse of a predetermined time after the pen-down state had been set is stored into memory means, and the coordinate data detected is output after the elapse of the predetermined time.

Further another object of the invention is to provide a coordinate input apparatus in which during a period of time to calculate the coordinate values of the indicated position, the occurrence of a fluctuation of an input pen is detected and the coordinate values are made invalid, thereby preventing an erroneous detection upon input of the coordinates.

BRIEF DESCRIPTION OF THE DRAWINGS

FIGS. 3(a) and 3(b) are diagrams for explaining a counter in an ROM and coordinate data;

DETAILED DESCRIPTION OF THE PREFERRED EMBODIMENTS

[First embodiment]

An embodiment according to the present invention will be described in detail hereinbelow with reference to the drawings.

Figure 1:
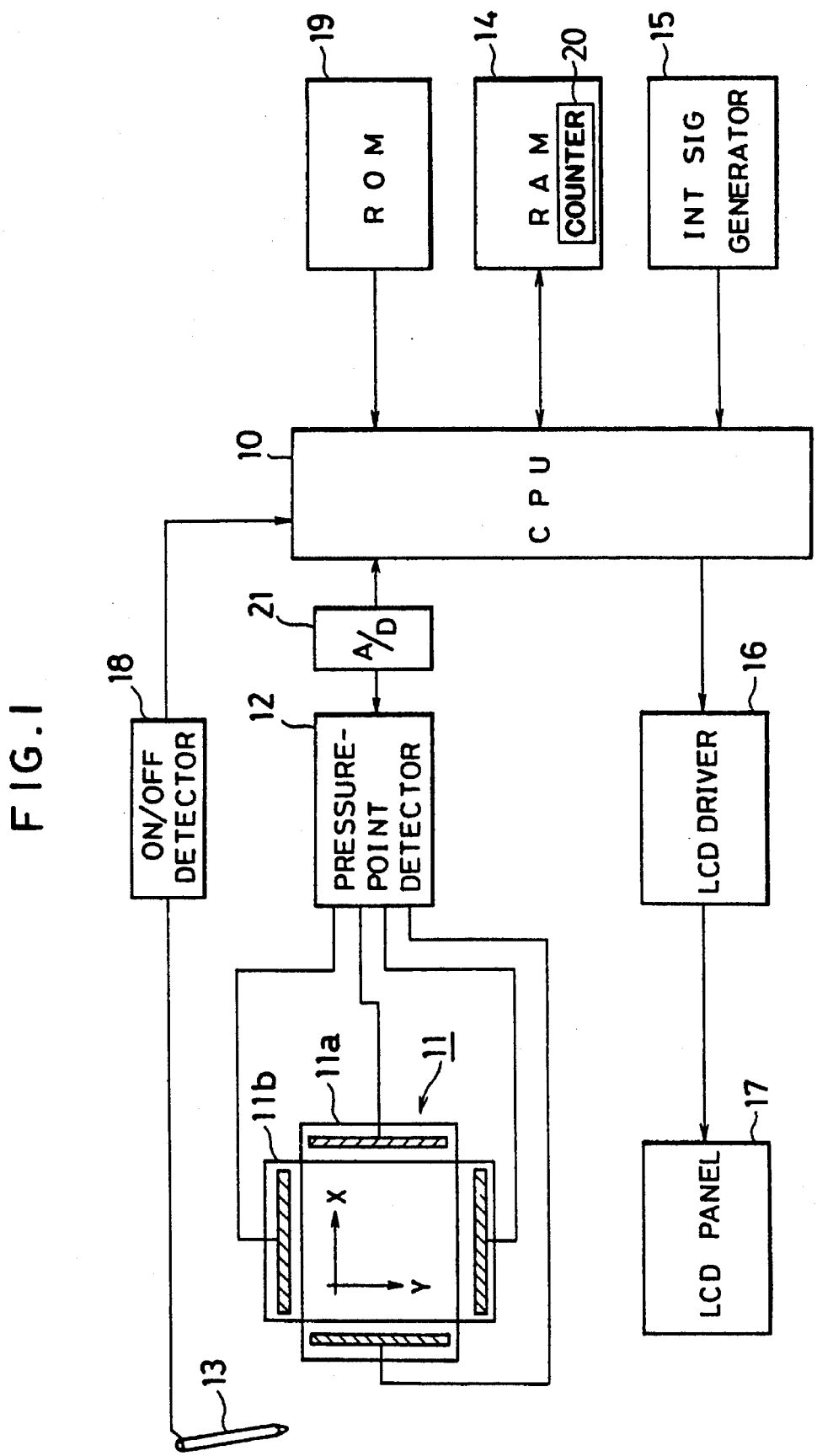
FIG. 1 is a block constructional diagram of a coordinate input apparatus in an embodiment.

FIG. 1 is a constructional diagram of a coordinate input apparatus in which a display is integrally assembled.

In the diagram, reference numeral 10 denotes a CPU to control the whole apparatus. Reference numeral 11 indicates a transparent input tablet using a resistive sheet. Coordinates are input by pressing the tablet surface by using an input pen 13. The input tablet 11 is constructed by a glass plate 11a (under layer) and a PET film 11b (upper layer). A resistive sheet is formed on the surface of the glass plate 11a by forming a material such as ITO or the like onto the surface of the glass plate by an evaporation depositing process, printing, or the like. The glass plate 11a and the film 11b are overlappingly arranged so that their resistive sheet surfaces face each other. A spacer (not shown) such as micro silicone rubber or the like is arranged between the glass plate and the film. Only when the surface of the film is pressed, both of the resistive sheets come into contact with each other at the pressure-point. On the other hand, conductor patterns as terminals to apply a voltage to the resistive sheets or to measure the potential are formed in both edge portions of the resistive sheets of the glass plate and film.

Reference numeral 12 denotes a pressure-point detector for applying a predetermined voltage to both ends of the resistive sheets and measuring the potential. The detector 12 detects the position of the pressure-point on the basis of the level of the measured potential.

Figure 11:
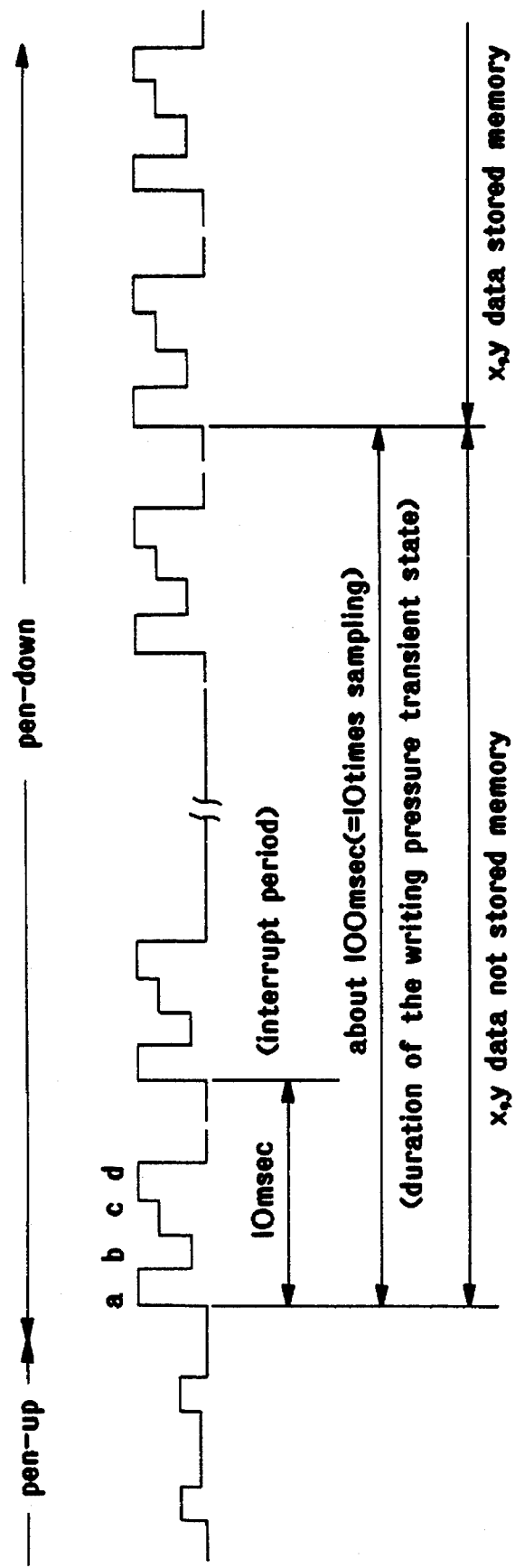
FIG. 11 is a schematic diagram showing the pen-up and pen-down state of the pen.

Reference numeral 14 indicates an RAM which, is used as a work area of the CPU 10 and stores various data. Reference numeral 15 denotes an INT signal generator for generating an interruption pulse signal to the CPU 10 every predetermined period, for instance, every 10 msec as shown in FIG. 11. Reference numeral 17 represents a liquid crystal display (LCD) panel which is actuated by an LCD driver 16. The LCD panel 17 is arranged under the tablet 11. Reference numeral 19 indicates an ROM in which a control processing procedure of the CPU 10 and the like are stored.

Ordinarily, the CPU 10 executes the information processes such as recognition of characters, figures, and the like, a document process, and the like. However, at every interrupting process, the CPU 10 controls the pressure-point detector 12 and samples the coordinate values of the indicated point. In addition to the programs regarding the process to recognize characters, figures, etc., a program with respect to a flowchart of FIG. 4, which will be explained hereinlater, is also stored in the ROM 19.

Reference numeral 21 indicates an A/D converter for converting an analog voltage value from the detector 12 into digital values. Reference numeral 18 represents an on/off detector to detect the on/off state of a switch provided in the input pen 13. Since a signal of the switch is sent to the main unit of the coordinate input apparatus, the main unit discriminates whether coordinates have been input or not on the basis of the on/off state of the switch signal.

<Description of the principle of the coordinate detection ( FIG. 2 )>

Figure 2:
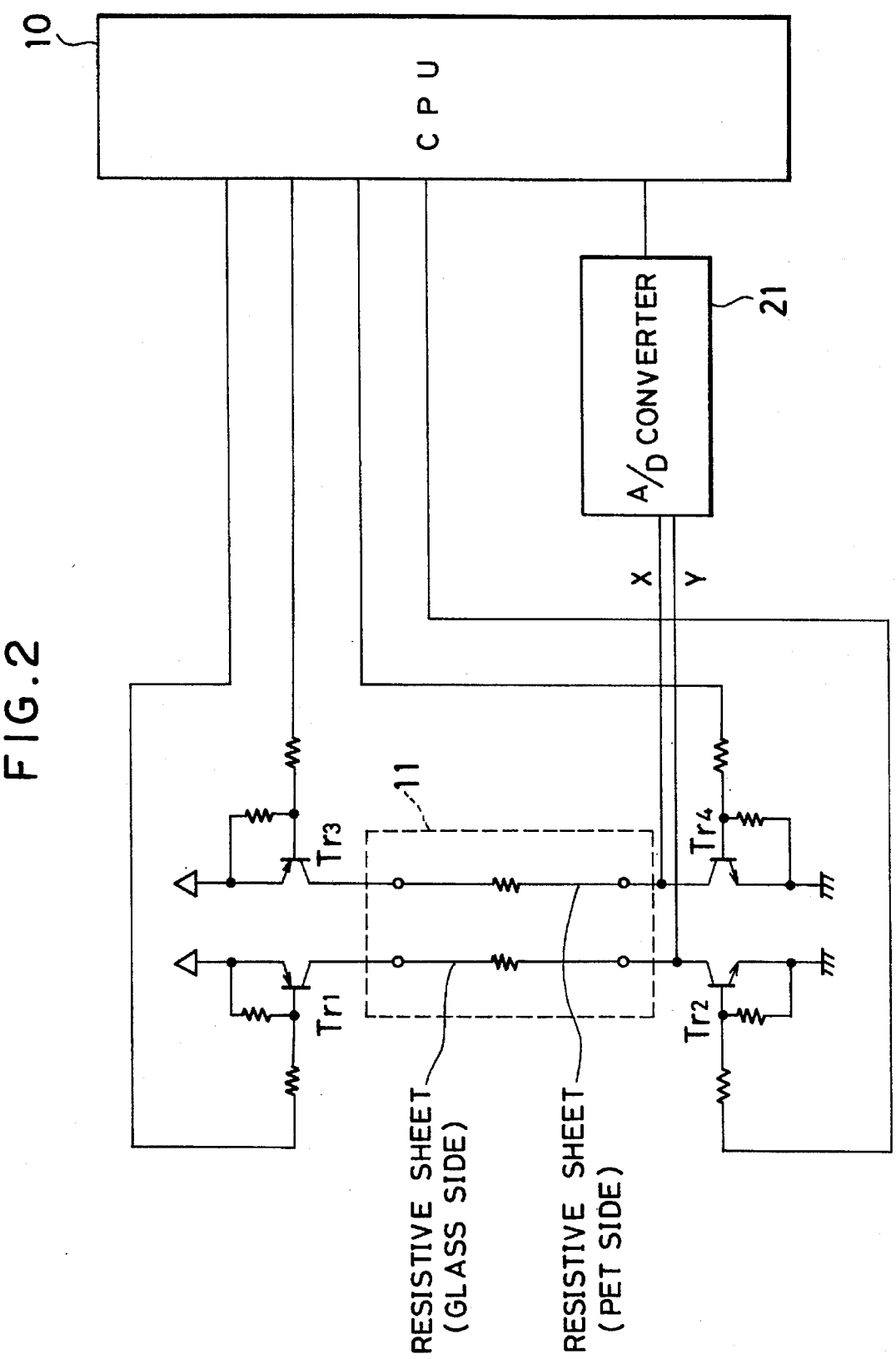
FIG. 2 is a diagram for explaining the principles of the detection of a pressure-point and the detection of coordinates.

FIG. 2 shows a practical circuit diagram showing the relation among the tablet 11, the CPU 10, and the pressure-point detector 12 in the embodiment. The detector 12 comprises transistors $Tr_1$ to $Tr_4$ and resistors shown in the diagram.

The principle to detect the up/down operation of the input pen 13 and the principle to detect coordinates will now be described hereinbelow with reference to FIG. 2.

First, an ON signal is output from the CPU 10 to the transistor $Tr_1$ and an OFF signal is output from the CPU 10 to the transistors $Tr_2$ to $Tr_4$. At this time, if the tablet has been completely pressed, the two resistive sheets of the tablet 11 come into contact with each other, so that a potential of a predetermined threshold value $V_{th}$ or more is obtained as an X output. On the other hand, if no pressure is applied to the tablet or if the pressing operation to the tablet is incomplete, only a potential less than $V_{th}$ is obtained as an X output. Therefore, by measuring the X output potential by the CPU 10 through the A/D converter 21, the up/down operation of the pen can be discriminated.

The control in the case of detecting coordinates will now be described. First, to detect the coordinate of the X axis, the ON signal is set to the transistors $Tr_1$ and $Tr_2$ and the OFF signal is sent to the transistors $Tr_3$ and $Tr_4$. In this state, the potential of the X input depends on the X coordinate of the pressure-point on the tablet. The data of the X coordinate value is obtained by A/D converting the potential and fetching. That is, the position (X axis) on the glass plate of the input pen 13 can be detected by the converted data. In a manner similar to the above, to detect the coordinate of the Y axis, the OFF signal is sent to the transistors $Tr_1$ and $Tr_2$ and the ON signal is sent to the transistors $Tr_3$ and $Tr_4$ and the potential data of a Y output is fetched.

<Description of the outline of the processes (FIG. 3)>

By setting the $V_{th}$ to a high level, coordinate detection in the case of an insufficient writing pressure can be prevented. However, the level of $V_{th}$ by which the up/down operation of the pen can be discriminated differs depending on the pressing position of the tablet, differs for every set, is deviated to a lower level due to a time-dependent change, and the like. Because of the above characteristics, if the $V_{th}$ is set to a fairly high level, in the case of an ordinary writing pressure, it is erroneously determined such that the pen-up operation has been executed. Therefore, the $V_{th}$ must be set to a slightly low level also in consideration of a margin. Such a level setting results in a cause of the drawbacks of the conventional technique. That is, even when the writing pressure is insufficient in a transient state of the writing pressure or the like, it is determined that the pen-down operation has been performed. The coordinates are detected for an insufficient contact state of the resistive sheets.

Therefore, the following control method is used in the embodiment. As shown in FIG. 3(a) and, 4 a counter 20 (one byte) and storage areas to store n coordinate value data are set in the RAM 14. Assuming that the each of the X and Y coordinate value data is expressed by 16 bits, four bytes are necessary to express the information of one point. Therefore, as shown in the diagram, addresses in the counter and the storage areas of the coordinate value data are set to 1, l+to l+4, l+5 to l+8, . . . , and l+4n—3 to l+4n. The count value of the counter is cleared to zero in the case of the pen-up operation upon execution of the interrupting process and is increased by "1" in the case of the pen-down operation and the interrupting process is finished. However, even in the case of the pen-down operation, the coordinates are not detected until the count value of the counter reaches a certain value (hereinafter, referred to as "K"), and the interrupting process is finished. After the interrupting process is repeated some times, if the count value of the counter reaches "K", the coordinates are detected and the coordinate value data which was sampled is stored into the storage areas beginning from address l+1.

The continuation time of the writing pressure transient state just after the pen-down operation differs in dependence on the holding state of the tablet, the material of the pen, and the writing operation of the user. However, it is at most a value within a range from tens of msec to about 100 msec as shown in FIG. 11. In the embodiment, since the interrupting process is executed every 10 msec, by setting the value of "K" to about 5 to 10, the uncertain coordinate value data just after the pen-down operation can be eliminated.

After that, the coordinate value data is stored in the storage area #1 for every sampling. Prior to such a storing operation, as shown in FIG. 3(b), the stored data in the storage areas is shifted one by one in a manner such that the data in the storage area #n−1 is shifted to the storage area #n, the data in the storage area #2 is shifted to the storage area #3, and the content (the coordinate data which has been input just before) in the storage area #1 is shifted to the storage area #2. The coordinate value data stored in the storage area #n before the above shifting process is output as detection coordinates into a dot train data storage area which is separately provided in the RAM 14. Then, the processing routine advances to the main processing routine. If the number of sampling times is n or less, since the coordinate value data to be output does not exist yet, it is not output. To know whether the number of sampling times has exceeded n, a check is made to see if the count value of the counter has reached "K+n−1" or not. If it has reached "K+n−1", the count value is not increased any more. By the processes mentioned above, the sampling data which is n-times precedent is always used as an output of the detection coordinates to be transferred to the main processing routine.

When the pen-up operation is detected after completion of the input of one stroke, the count value of the counter is cleared to zero and the interrupting process is finished.. At this time, the coordinate value data stored in the storage areas #1 to #n is not output but abandoned. Since the continuation time of the writing pressure transient state just before the pen-up operation is set to at most about tens of 10 msec, if the sampling period is set to 10 msec as mentioned above, by setting the value of n to about 3 to 7, the uncertain coordinate value data just before the pen-up operation can be eliminated from the output data.

However, since the output of the detection coordinates is always set to the n-times precedent sampling coordinate value, the delay of only n ×sampling period occurs for the time interval from the input to the output. However, the delay of up to about 100 msec is hardly felt by the user. Therefore, when the sampling period is set to 10 msec, and the value of n is set to 3 to 7, no practical problem occurs.

<Description of the processing procedure (FIG. 4)>

Figure 4:
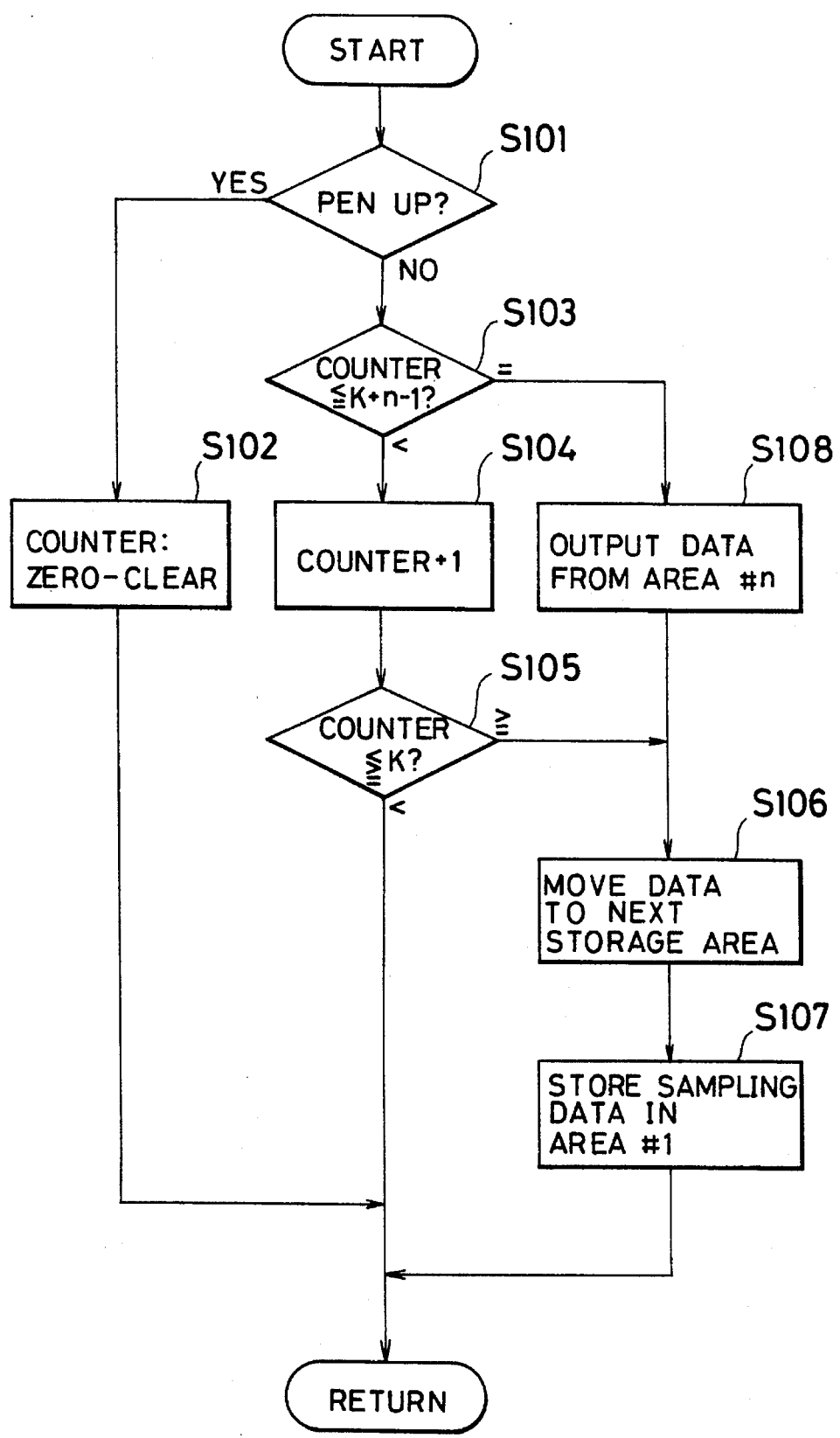
FIG. 4 is a flowchart for explaining the content of an interrupting process in the embodiment.

The above processes will be summarized in a flowchart of FIG. 4. As already described before, the flowchart shows the interrupting process which is executed by the signal reception from the INT signal generator 15. First, in step S101, a check is made to see if the pen-up operation or the pen-down operation has been executed. If the pen-up operation has been performed, in step S102, the count value of the counter is cleared to zero and the processing routine is returned to the main routine. If the pen-down operation has been executed, step S103 follows and the count value of the counter is compared with "K+n−1". As the result of the comparison, if the count value is less than "K+n−1", this means that the timing to output the coordinate value data does not come yet, so that the processes in step S104 and subsequent steps are executed.

In step S104, the count value of the counter is first increased by "1". In the next step S105, a check is made to see if the count value is less than K or not. If it is less than K, this means that the writing pressure is still in the transient state just after the pen-down operation. Therefore, no more processing is executed and the processing routine is returned to the main routine. On the contrary, if the count value is "K" or more, this means that the writing pressure is in the stable state, so that steps S106 and S107 follow. In step S106, the data in each storage area is shifted to the next storage area. After that, in step S107, the coordinate values are detected and the detection coordinate value data is stored into the storage area #1 and the processing routine is returned to the main routine.

On the other hand, in step S103, if it is determined that the count value has reached "K+n−1", step S108 follows and the coordinate data stored in the storage area #n is output as detection data and the above-mentioned processes are executed.

Although the above embodiment has been described with respect to the case where the coordinate data is not output just after the pen-down operation and just before the pen-up operation, it has been found that even in the pen-down operation, a fluctuation also occurs in the coordinate values.

Figure 5:
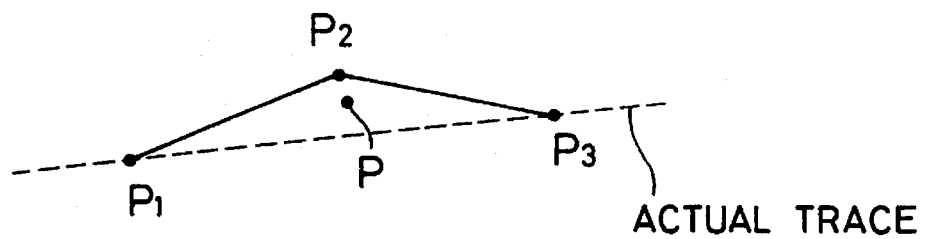
FIG. 5 is a diagram for explaining the outline of correction of coordinate data.

For instance, as shown in FIG. 5, it is assumed that the detection coordinate values of $P_1$, $P_2$, and $P_3$ were obtained for a trace as shown by a broken line. A fluctuation occurs in the value $P_2$ due to causes such as noises, quantization errors, temporary lack of writing pressure, and the like. To apparently reduce an amount of such fluctuation, as will be also obvious from the diagram, it is sufficient to output the mean value, that is, $$P = \frac{P_1 + P_2 + P_3}{3}$$

among the data at point $P_2$ and the data at the points $P_1$ and $P_3$ before and after the point $P_2$ instead of the data at point $P_2$ itself.

Figure 6:
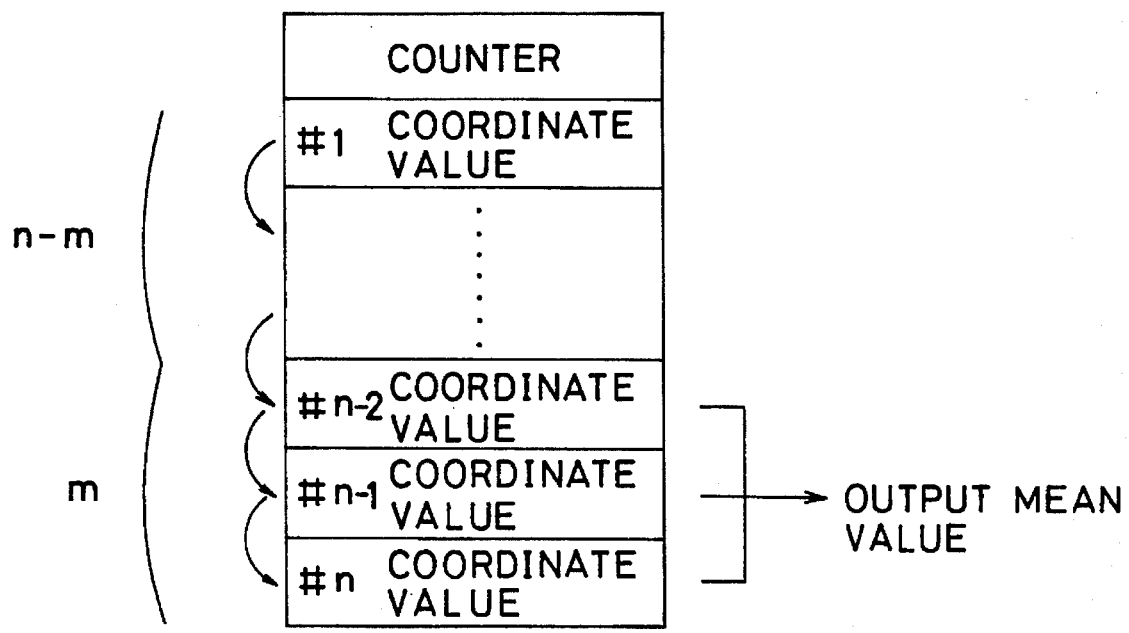
FIG. 6 is a diagram showing a storage state of data in the case of executing a correcting process.

Therefore, as in the foregoing embodiment, if the mean value of the data in the storage areas #n, #n−1, and #n−2 is output as shown in FIG. 6 instead of simply using the coordinate value data in the storage area #n as the output data, the fluctuation which occurs due to the causes such as noises and the like can be reduced.

The number of data which are used to calculate the mean value is not limited to three but it is sufficient to use arbitrary number m among the n storage data.

A method of calculating the mean value (a correcting method) is not limited to only the arithmetic mean method. For instance, it is also possible to use a weighting method of weighting such as $$P = \frac{P_1 + 2 \times P_2 + P_3}{4}$$

or a geometric mean method.

In the case of using the mean value of m data among the n data as the output data as mentioned above, the data in the storage areas from #1 to #(n−m) are abandoned upon pen-up operation. Therefore, if the value of (n−m) is set to about 3 to 7, the uncertain coordinate value data just before the pen-up operation can be eliminated from the output data in a manner similar to the case of the embodiment.

As described above, according to the embodiment, since the unstable detection coordinate data upon pen-up/pen-down operations are eliminated and the resultant stable data is output. Therefore, the stable coordinate data can be output. Thus, the recognizing efficiency can be eventually raised.

[Second embodiment]

In the first embodiment, the uncertain coordinate data in the writing pressure transient state just after the pen-down operation has been abandoned. However, in the following second embodiment, a check is made to see if the writing pressure on the input surface of the coordinate input apparatus is incomplete or not, in other words, to see if the pressure on the input surface has been released or not, and if the pressure was released, the calculated coordinate values are not used.

The second embodiment of the present invention will be described in detail hereinbelow with reference to the drawings.

Since a schematic construction of the coordinate input apparatus according to the embodiment is the same as the construction shown in FIG. 1 regarding the first embodiment, its description is omitted.

The coordinate detecting process as a feature of the second embodiment will now be described hereinbelow.

Figure 7:
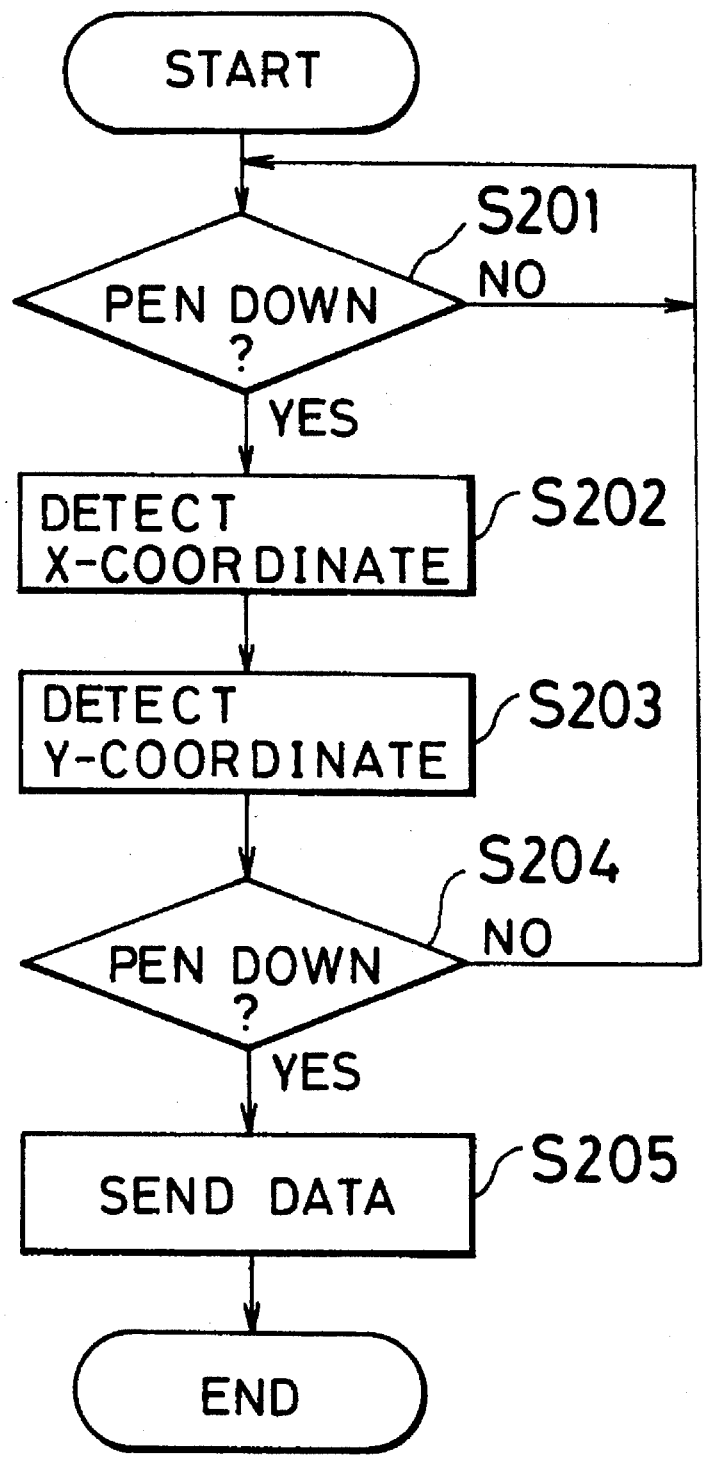
FIG. 7 is a flowchart showing a coordinate input process in a coordinate input apparatus in the second embodiment.

FIG. 7 is a flowchart showing the coordinate detecting process of the CPU 10 of the coordinate input apparatus of the embodiment. A control program to execute such a process is stored in the ROM 19.

First, in step S201, on the basis of the signal from the on/off detector 18, a check is made to see if the input pen 13 has been put down or not. If the input pen 13 has been lifted up, the coordinate values are not detected. If the input pen 13 has been put down, step S202 follows. The pen-up/pen-down operation can be discriminated by checking whether the signal from the on/off detector 18 is at the high level or the low level.

In step S202, a signal of the X axis detection is output to the pressure-point detector 12 and the voltage value which was converted into the digital value by the A/D converter 21 is input. After that, step S203 follows and in a manner similar to the above, the signal of the Y axis detection is output to the pressure-point detector 12 and the voltage value from the A/D converter 21 is input. When the voltage values corresponding to both coordinates of the X and Y axes are input, step S204 follows and the up/down operation of the input pen 13 is gain discriminated. At this time, if the pen-down state continues, step S205 follows and those voltage values are specified as the coordinate value. After the voltage value is converted into the coordinate value, the coordinate value is sent to an apparatus to which the coordinate input apparatus is connected.

In the other case, that is, if the input pen 13 has been lifted up in step S204, the input data in steps S202 and S203 is not used. The processing routine is returned to the loop to discriminate the up/down state of the input pen 13 in step S201. By repeating the above operations, coordinates at a number of input points can be obtained and output within a predetermined time. As mentioned above, the up/down state of the input pen is discriminated before and after the coordinate detecting process and when it is detected that the input pen has been lifted up during the detection of the coordinate position, the coordinate position is not used, thereby enabling the accuracy of the coordinate detection to be improved.

In the above embodiment, there is provided the switch to detect that the pen has been pressed onto the tablet and the up/down state of the input pen 13 is executed at the start and end of the coordinate detection. However, invention is not limited to such a method.

[Third embodiment]

The third embodiment will be described hereinbelow with reference to FIGS. 8 and 9.

Figure 8:
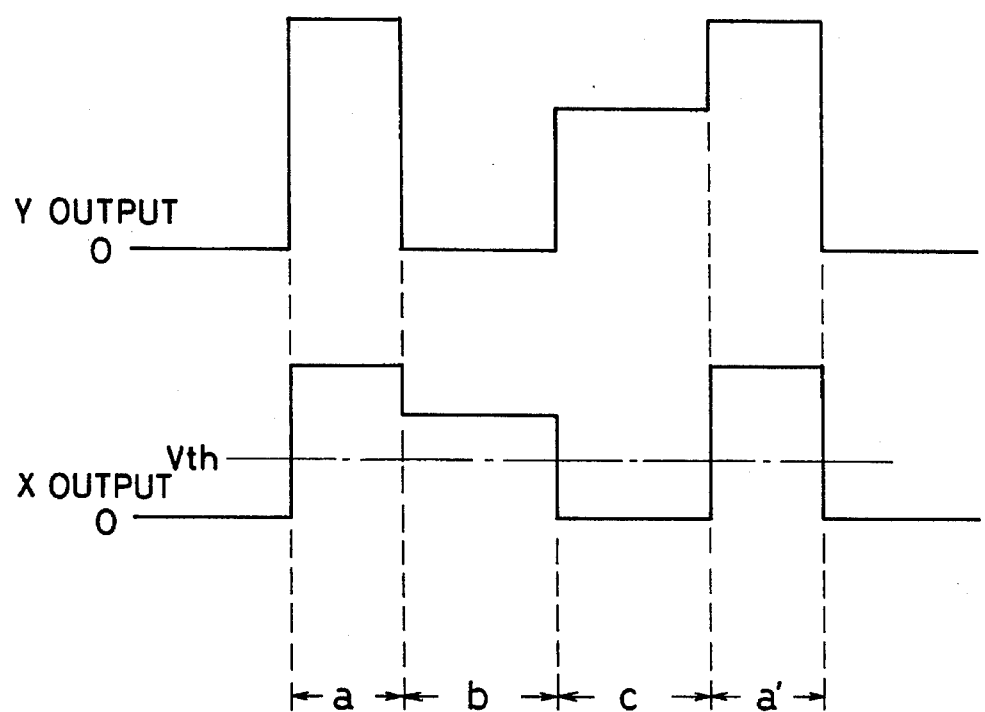
FIG. 8 is a timing chart showing the coordinate detecting timing in the third embodiment.

FIG. 8 is a timing chart showing the coordinate detecting process in the third embodiment.

Figure 9:
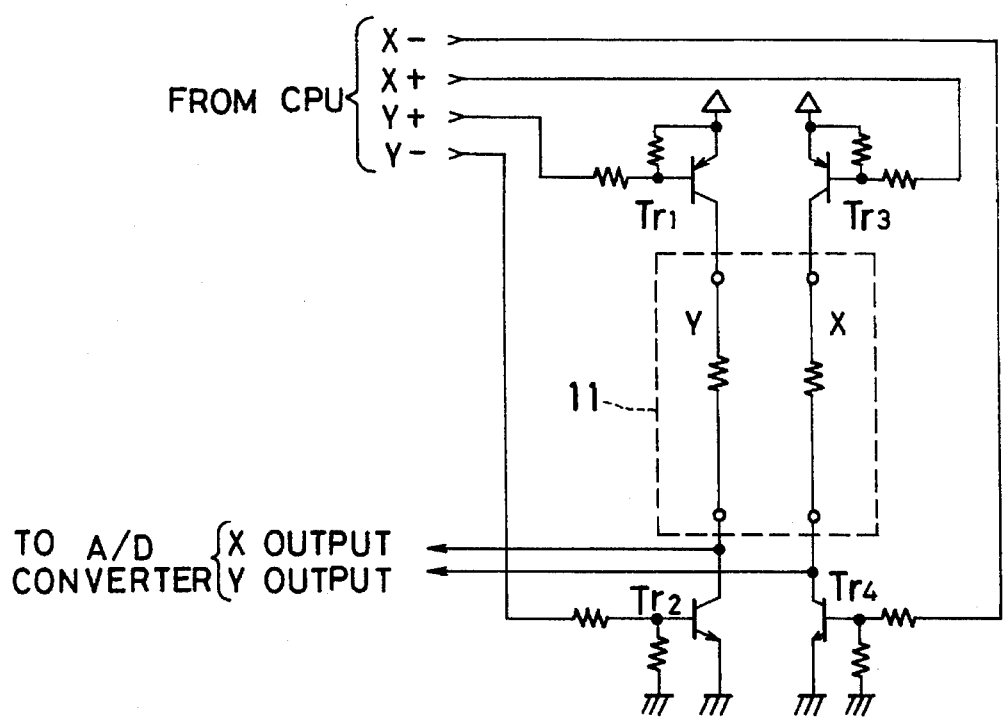
FIG. 9 is a diagram showing an example of a construction of a detector in the embodiment.

FIG. 9 is a diagram showing an example of a circuit construction for detecting the up/down state of the input pen and for detecting the coordinates of the resistive sheet tablet without using a switch to detect the up/down state of the input pen. The circuit construction is the same as that of the pressure-point detector 12 in FIG. 1.

In FIG. 8, a, b, c, and a ' denote periods of time for the discrimination of the pen-down operation, the detection of the X coordinate, the detection of the Y coordinate, and the discrimination of the pen-down operation. The third embodiment will be described hereinbelow together with the operation of FIG. 9.

First, when the pen-down operation is detected at timing a in FIG. 8, a low-level signal is applied to a signal line X+in FIG. 9 from the CPU 10, a high-level signal is applied to a signal line Y+, and a low-level signal is applied to signal lines X−and Y−. Thus, only the PNP transistor $Tr_3$ is turned on and all of the other transistors are turned off. At this time, if the input surface of the tablet 11 is pressed, a voltage of the predetermined threshold value $V_{th}$ or more is obtained from the X output for the period of the timing a. If the input surface of the tablet 11 is not pressed or its pressing operation is incomplete, the X output level for the period of the timing a does not exceed $V_{th}$. Therefore, it is regarded that the input pen has been lifted up and the above operations are repeated until the input pen is put down.

When the X output for the period of the timing a exceeds $V_{th}$, the detection of the coordinate position is started. For the period of the timing b, the X coordinate is detected. At this time, the CPU outputs the control signals so as to turn on the PNP transistor $Tr_3$ and to turn off the NPN transistors $Tr_1$ and $Tr_2$. Practically speaking, the signal lines X+, X−, and Y−are set to the low level and the signal line Y+is set to the high level.

In this state, the X output depends on the X coordinate of the point of the tablet 11 which was pressed. By fetching such a voltage as a value which was converted into the digital value by the A/D converter 21, the X coordinate data can be obtained.

The Y coordinate is detected for the period of the timing c. In this case, the transistors $Tr_1$ and $Tr_2$ are turned on and the transistors $Tr_3$ and $Tr_4$ are turned off. The voltage of the Y output at this time is input in a manner similar to the case of the timing a and the Y coordinate data is obtained on the basis of the voltage value. After the X and Y coordinate data were derived as mentioned above, for the period of the timing a', the transistor $Tr_3$ is again turned on and the transistors $Tr_1$, $Tr_2$, and $Tr_4$ are turned off. The up/down operation of the input pen is detected in a manner similar to the case of the timing a. If the input pen has been lifted up, the voltage values of the X and Y axes which had been input so far are made invalid and the process at the timing a is again executed.

The accuracy of the data is improved by discriminating the up/down state of the input pen before and after the detection of the coordinates as mentioned above.

Although the detection data has been output to the apparatus itself (main routine) in the first embodiment, the invention is not limited to such a construction. The detection data output can be also output to an external host computer or the like. In this case, the apparatus is used only to detect the coordinates. Therefore, it is sufficient to detect the coordinates by the main routine (the INT signal generator 15 and the like are unnecessary).

On the other hand, although the first embodiment has been described with respect to the example in which the coordinate input apparatus of the resistive sheet type has been used, the invention is not limited to such an example. The invention can be also widely applied to the coordinate input apparatus of another type (for instance, ultrasonic vibration type) in which the detection coordinate value fluctuates if the writing pressure is incomplete.

Figure 10:
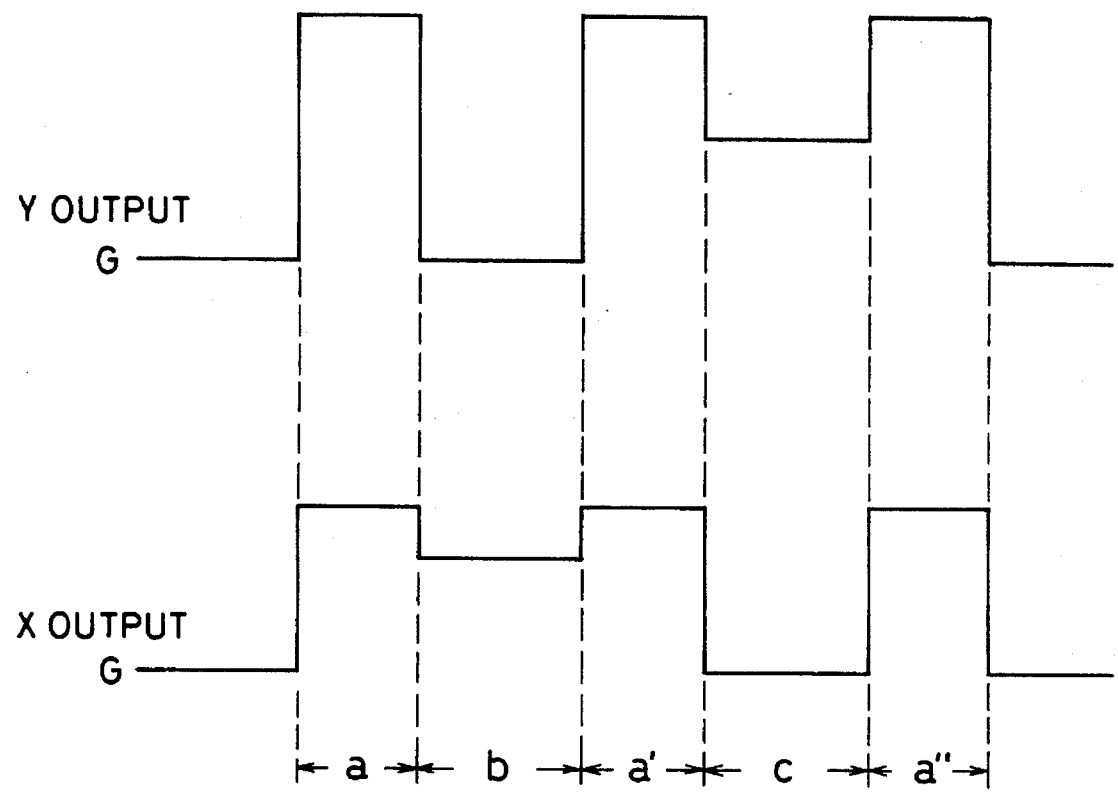
FIG. 10 is a diagram showing the timing for detecting coordinates in the third embodiment.

Further, in the third embodiment, the timings for discriminating the up/down state of the input pen are not limited to the timings before and after the coordinate detection. As shown by a' in FIG. 10, the up/down state of the input pen can be also discriminated for the time interval between the periods of b and c to detect the X and Y coordiantes. As mentioned above, if the up/down state of the input pen is detected many times for the single coordinate input period of time, the detection can be further effectively executed.

In addition, the up/down state of the input pen can be discriminated by other various kinds of methods. For instance, the coordinate detection can be started by the interruption by the input pen 13 and the discrimination at the end of the coordinate detection can be also executed by the voltage level detection as shown in FIG. 8 or 9.

As described above, according to the invention, stable coordinate data can be output without adding a burden to an apparatus to which the detection data is output.

On the other hand, when the coordinate data is output, by correcting the coordinate data by a group of coordinate data existing before and after it with respect to the time, further stable coordinate data can be output.

According to the invention, when it is detected that the input pen has been lifted up or put down for the period of time to calculate the coordinate values, by making the coordinate values invalid, there is an advantage such that the erroneous detection by the up/down operation of the input pen upon inputting of the coordinates or the like can be prevented.

What is claimed is:

1. A coordinate input apparatus for detecting and outputting coordinate value data of a desired position by indicating a desired position on a coordinate input surface with an input pen, said apparatus comprising:

output means for outputting coordinate value detecting means for detecting a down state of the input pen;

measuring means for measuring a predetermined continuation time of a writing pressure transient state just after detection of a down state of the input pen by said detecting means;

memory means for storing coordinate value data;

sampling means for starting sampling of coordinate value data after detection of a down state of the input pen and for repeatedly sampling the coordinate value data in a sampling time period that is shorter than the continuation time of the writing pressure transient state just after the pen is placed in a down state;

memory control means for controlling said memory means not to store the coordinate value data sampled by said sampling means during the predetermined continuation time measured by said measuring means but to store the coordinate value data sampled by said sampling means after the elapse of the predetermined continuation time measured by said measuring means; and output control means for controlling said output means to output the coordinate value data stored in said memory means.

2. An apparatus according to claim 1, wherein said output means comprises display means for displaying the coordinate value data.

3. An apparatus according to claim 2, wherein said display means comprises a liquid crystal display.

4. A coordinate input apparatus for detecting and outputting coordinate value data of a desired position by indicating a desired position on a coordinate input surface with an input pen, said apparatus comprising:

sampling means for starting sampling of coordinate value data after detection of a down state of the input pen and for repeatedly sampling the coordinate value data in a sampling time period that is shorter than a continuation time of a writing pressure transient state just after the pen is placed in a down state;

output means for outputting the coordinate value data;

detecting means for detecting an up state of the input pen;

memory means for storing a plurality of coordinate value data sampled before the coordinate value data of the indicated position; and control means for controlling said memory means to delete a plurality of pieces of data from coordinate value data stored during the continuation time of the writing pressure transient state before detection of an up state of the input pen when the up state of the input pen is detected by said detecting means.

5. An apparatus according to claim 4, wherein said output means comprises means for displaying the coordinate value data.

6. A coordinate input apparatus for detecting and outputting coordinate value data of a desired position by indicating a desired position on a coordinate input surface with an input pen, said apparatus comprising:

sampling means for starting sampling of coordinate value data after detection of a down state of the input pen and for repeatedly sampling the coordinate value data in a sampling time period that is shorter than a continuation time of a writing pressure transient state just after the pen is placed in a down state;

output means for outputting the coordinate value data;

detecting means for detecting a down state of the input pen;

memory means for storing, in pairs, x and y components of a plurality of coordinate value data sampled before the sampling of the coordinate value data of the indicated position; and control means for deriving average values of the x and y components of the plurality of coordinate value data when the down state of the input pen is detected by said detecting means, and for controlling said output means to output new coordinate value data having the derived average values of the x and y components.

7. An apparatus according to claim 6, wherein said output means comprises means for displaying the coordinate value data.

* * * * *

UNITED STATES PATENT AND TRADEMARK OFFICE
CERTIFICATE OF CORRECTION

PATENT NO. : 5,561,447
DATED : October 1, 1996
INVENTOR(S) : NORIYUKI SUZUKI, ET AL.

It is certified that error appears in the above-indentified patent and that said Letters Patent is hereby corrected as shown below:

COLUMN 1

Line 15, "for-outputting" should read --for outputting--.
Line 18, "attracts" should read --has attracted--.
Line 28, before "every" insert --in--.
Line 59, "fairly, inconvenient" should read --fairly inconvenient--.

COLUMN 2

Line 32, "Further another" should read --Further, another--.
Line 47, "an ROM" should read --a ROM--.
Line 65, "state of" should read --states of--.

COLUMN 3

Line 32, "which, is" should read --which is--.
Line 49, "hereinlater," should read --hereinafter--.
Line 57, delete "(".
Line 58, "FIG. 2)" should read --(Fig. 2)--.

UNITED STATES PATENT AND TRADEMARK OFFICE
CERTIFICATE OF CORRECTION

PATENT NO. : 5,561,447
DATED : October 1, 1996
INVENTOR(S) : NORIYUKI SUZUKI, ET AL.

It is certified that error appears in the above-indentified patent and that said Letters Patent is hereby corrected as shown below:

COLUMN 4

Line 15, "set" should read --sent--.
Line 28, "an insufficient" should read --insufficient--.
Line 34, "an ordinary" should read --ordinary--.
Line 35, delete "such".
Line 38, "results in a cause of" should read --causes--.
Line 45, "FIG. 3(a) and, 4" should read --FIG. 3(a),--.
Line 51, "1+to" should read --1+1 to--.
Line 52, "1+4n—3" should read --1+4n-3--.
Line 55, ""1"" should read --"1"--.
Line 61, "some" should read --a number of--.
Line 63, "into" should read --in--.
Line 66, "in dependence" should read --depending--.

COLUMN 5

Line 31, "finished.." should read --finished.--.
Line 42, "Xsampling" should read --x sampling--.

UNITED STATES PATENT AND TRADEMARK OFFICE
CERTIFICATE OF CORRECTION

PATENT NO. : 5,561,447         Page 3 of 4
DATED : October 1, 1996
INVENTOR(S) : NORIYUKI SUZUKI, ET AL.

It is certified that error appears in the above-indentified patent and that said Letters Patent is hereby corrected as shown below:

COLUMN 6

Line 7, "into" should read --in--.
Line 38, delete "the" (second occurrence).
Line 41, "use arbitrary" should read --use an arbitrary--.
Line 45, delete "of".
Line 46, "weighting such" should read --such--.
Line 59, delete "since".

COLUMN 7

Line 15, "will now be" should read --is--.
Line 59, "However, invention" should read --However, the invention--.

COLUMN 8

Line 5, "a ′ denote" should read --a′ denote--.
Line 12, "X+in" should read --X+ in--.
Line 15, "X-and" should read --X- and--.
Line 31, "Y-are" should read --Y- are--, and "Y+is" should read --Y+ is--.

UNITED STATES PATENT AND TRADEMARK OFFICE
CERTIFICATE OF CORRECTION

PATENT NO. : 5,561,447
DATED : October 1, 1996
INVENTOR(S) : NORIYUKI SUZUKI, ET AL.

It is certified that error appears in the above-indentified patent and that said Letters Patent is hereby corrected as shown below:

COLUMN 9

Line 9, "coordiantes." should read --coordinates.--.
Line 38, "value" should read --value data;--.

Signed and Sealed this

Eighth Day of April, 1997

BRUCE LEHMAN

Attesting Officer      Commissioner of Patents and Trademarks